(12) United States Patent
Machado et al.

(10) Patent No.: US 6,506,361 B1
(45) Date of Patent: Jan. 14, 2003

(54) GAS-LIQUID REACTION PROCESS INCLUDING EJECTOR AND MONOLITH CATALYST

(75) Inventors: Reinaldo Mario Machado, Allentown, PA (US); Robert Roger Broekhuis, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/573,726

(22) Filed: May 18, 2000

(51) Int. Cl.$^7$ .................................................. B01J 10/00
(52) U.S. Cl. ............................. 423/659; 423/DIG. 13; 585/260
(58) Field of Search .................... 423/659, DIG. 13, 423/588; 585/260, 262, 269, 273, 274, 275, 276; 564/421, 422, 423; 422/194

(56) References Cited

U.S. PATENT DOCUMENTS

| | | | |
|---|---|---|---|
| 4,140,625 A | * 2/1979 | Jensen | |
| 4,378,336 A | 3/1983 | Yoon | 422/201 |
| 4,670,602 A | 6/1987 | Louthan | 568/26 |
| 4,743,577 A | 5/1988 | Schroeder et al. | 502/331 |
| 5,063,043 A | 11/1991 | Bengtsson | 423/588 |
| 5,071,634 A | 12/1991 | Maunula et al. | 423/588 |
| 6,005,143 A | * 12/1999 | Machado et al. | |
| 6,262,317 B1 | 7/2001 | Becker et al. | 568/861 |

FOREIGN PATENT DOCUMENTS

| | | |
|---|---|---|
| DE | 19936208 | 2/2001 |
| EP | 0815933 | 6/1997 |
| WO | 9302960 | 2/1993 |
| WO | 9815513 | 4/1998 |

OTHER PUBLICATIONS

Hatziantoniou, et al. "The Segmented Two–Phase Flow Monolithic Catalyst Reactor. An Alternative for Liquid Phase Hydrogenations" Ind. Eng. Chem Fundam. vol. 23, No. 1, 82–88 (1984), no month.

Hatziantoniou, et al. "Mass Transfer and Selectivity in Liquid–Phase Hydrogenation of Nitro Compounds in a Monolithic Catalyst Reactor with Segmented Gas–Liquid Flow" Ind. Eng. Chem Process Des. vol. 25, No. 4, 964–970 (1986), no month.

\* cited by examiner

*Primary Examiner*—Steven Bos
(74) *Attorney, Agent, or Firm*—Russell L. Brewer; Keith D. Gourley

(57) ABSTRACT

This invention relates to process for carrying out gas-liquid reactions such as those employed in the hydrogenation or oxidation of organic compounds. In the catalytic reaction of a liquid reactant and a gaseous reactant to form a product, the improvement which comprises: pressurizing a liquid reactant and, then, introducing the resultant pressurized liquid reactant to a liquid motive gas ejector wherein it is mixed with the gaseous reactant. The mixture is passed to and reacted in a monolith catalytic reactor. The products are removed from the monolith catalytic reactor at a reduced pressure and, then introduced to a tank. The unreacted materials in the reaction product then are recirculated back to the ejector.

5 Claims, 1 Drawing Sheet

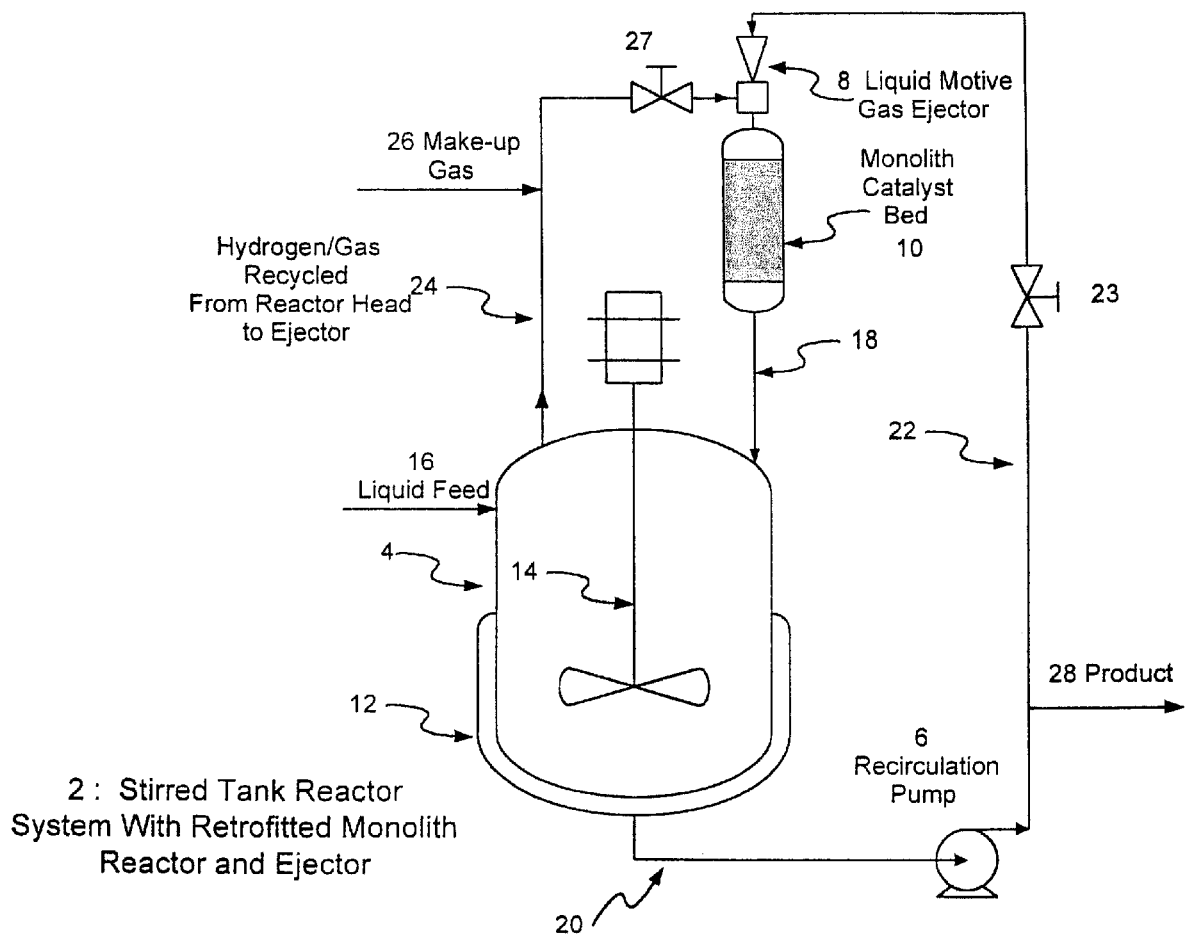

GAS-LIQUID REACTION PROCESS INCLUDING EJECTOR AND MONOLITH CATALYST

BACKGROUND OF THE INVENTION

Many industrial reactions, particularly those that involve the hydrogenation of organic compounds, are performed in stirred tank reactors employing a slurry catalyst system. Slurry catalysts are solid-phase, finely divided powders and are carried in the liquid reaction medium. The catalytic reaction is carried out, then, by contacting a reactive gas, such as hydrogen or oxygen, with the liquid organic compound in the presence of the solid-phase catalyst. On termination of the reaction, the catalyst is removed, generally by filtration, and the reaction product is recovered.

Slurry catalyst systems are inherently problematic in a number of areas, including industrial hygiene, safety, environmental, waste production, operability, selectivity and productivity. One problem, for example, is that these catalysts often are handled manually during a typical hydrogenation operation in a stirred tank reactor. Another is that many of the catalysts, hydrogenation catalysts in particular, are pyrophoric and thereby create additional safety concerns. These problems are compounded to a certain extent in that reaction rate often is a function of the catalyst concentration and, thus, catalyst concentrations generally are kept at high levels.

Monolith catalysts have been suggested for use in industrial gas-liquid reactions, but have achieved limited success. One of the advantages of monolith catalysts over slurry catalysts is that they eliminate the handling of powdered catalysts, including catalyst charging and filtration when the reaction is complete.

The following articles and patents are representative of catalytic processes including hydrogenation of organic compounds.

Hatziantoniou, et al. in "The Segmented Two-Phase Flow Monolithic Catalyst Reactor. An Alternative for Liquid-Phase Hydrogenations,", Ind. Eng. Chem. Fundam., Vol. 23, No.1, 82–88 (1984) discloses the liquid-phase hydrogenation of nitrobenzoic acid to aminobenzoic acid in the presence of a solid palladium monolithic catalyst. The monolithic catalyst consisted of a number of parallel plates separated from each other by corrugated planes forming a system of parallel channels having a cross sectional area of 1 mm$^2$ per channel. The composition of the monolith comprised a mixture of glass, silica, alumina, and minor amounts of other oxides reinforced by asbestos fibers with palladium metal incorporated into the monolith in an amount of 2.5% palladium by weight. The reactor system was operated as a simulated, isothermal batch process. Feed concentrations between 50 and 100 moles/m$^3$ were cycled through the reactor with less than 10% conversion per pass until the final conversion was between 50% and 98%

Hatziantoniou, et al. in "Mass Transfer and Selectivity in Liquid-Phase Hydrogenation of Nitro Compounds in a Monolithic Catalyst Reactor with Segmented Gas-Liquid Flow", Ind. Eng. Chem. Process Des. Dev., Vol. 25, No.4, 964–970 (1986) disclose the isothermal hydrogenation of nitrobenzene and m-nitrotoluene in a monolithic catalyst impregnated with palladium. The authors report that the activity of the catalyst was high and therefore mass-transfer determined the rate. Hydrogenation was carried out at 590 and 980 kPa at temperatures of 73 and 103° C. Less than 10% conversion per pass was achieved.

U.S. Pat. No. 4,743,577 discloses metallic catalysts which are extended as thin surface layers upon a porous, sintered metal substrate for use in hydrogenation and decarbonylation reactions. In forming a monolith, a first active catalytic material, such as palladium, is extended as a thin metallic layer upon a surface of a second metal present in the form of porous, sintered substrate and the resulting catalyst used for hydrogenation, deoxygenation and other chemical reactions. The monolithic metal catalyst incorporates such catalytic materials such as palladium, nickel and rhodium, as well as platinum, copper, ruthenium, cobalt and mixtures. Support metals include titanium, zirconium, tungsten, chromium, nickel and alloys.

U.S. Pat. No. 5,063,043 discloses a process for the hydrogenation of anthraquinones using a monolithic reactor. The reactor is operated in a down-flow configuration, in which liquid is distributed to the top of the reactor, and hydrogen is drawn into the reactor by the action of gravity on the descending liquid. In the preferred implementation, in which there is no net pressure difference between the inlet and the outlet of the reactor, this mode of operation can be characterized as gravity downflow.

BRIEF SUMMARY OF THE INVENTION

This invention relates to apparatus suited for gas-liquid reactions such as those employed in the hydrogenation or the oxidation of organic compounds and to a process for effecting gas-liquid reactions. The apparatus comprises the following:

a tank having at least one inlet for introduction of liquid, at least one outlet for removal of liquid, and at least one outlet for removal of gas;

a pump having an inlet and an outlet;

a liquid motive gas ejector having at least one inlet for receiving liquid, at least one inlet for receiving a reactant gas, and at least one outlet for discharging a mixture of said liquid and said reactant gas;

a monolith catalytic reactor having an inlet and an outlet;

wherein:

the inlet of said pump is in communication with said outlet from said tank for removal of liquid and said outlet of said pump is in communication with said inlet of said liquid motive gas ejector for receiving liquid, the outlet from said liquid motive gas ejector for discharging the resultant mixture of liquid and gaseous reactant is in communication with the inlet to said monolith catalytic reactor and the outlet of said monolith catalytic reactor is in communication with at least one inlet to said tank, and, the outlet from the tank for removal of gas is in communication with said inlet of the liquid motive gas ejector for receiving gas.

The apparatus described herein enables one to effect a catalytic retrofit of a slurry reactor and thereby offer many of the following advantages:

an ability to eliminate slurry catalysts and thereby minimize handling, environmental and safety problems associated with slurry catalytic processes;

an ability to interchange catalytic reactors when changing to a different chemistry in the same equipment;

an ability to effect multiple (sequential or parallel) reactions by using multiple catalytic reactors arranged either in series or in parallel;

an ability to maintain a separation of the reactants and reaction products from the catalyst during heat-up and cool-down and thereby minimize by-product formation and catalyst deactivation; and, an ability to precisely start and stop a reaction by initiating or terminating circulation of the reactor contents through the liquid motive gas ejector and monolith catalytic reactor.

BRIEF DESCRIPTION OF THE DRAWING

The drawing is a view of a stirred tank reactor retrofitted for use with a monolith catalytic reactor.

DETAILED DESCRIPTION OF THE INVENTION

Slurry processes often suffer from the problem of excessive by-product formation and catalyst fouling or deactivation. These problems are in addition to those of handling and separation in slurry catalyst operation. One explanation for byproduct formation and catalyst deactivation is that during start-up and shutdown of a process, the catalyst is in contact with the liquid phase and the reactants and/or reaction products therein for an extended period of time. Conditions during start-up and shutdown involve heat-up, cool-down, pressurization, and venting of the,stirred tank which may have an adverse effect on the product quality and catalyst activity. For example, the changing conditions, particularly during shutdown when the catalyst is in contact with the reaction product, often promote byproduct formation and catalyst deactivation. Thus, the extended contact of the catalyst with the reactants and reaction product limits the ability of the operator to control reaction conditions.

To facilitate an understanding of the retrofitted stirred tank reactor equipped with a monolith catalyst and to understand how it addresses the above problems and achieve the many advantages that can result therefrom, reference is made to FIG. 1. FIG. 1 is a schematic of a retrofit apparatus for a stirred tank reactor employing a monolith catalytic reactor. The retrofit system 2 comprises a tank 4, a circulation pump 6, a liquid motive gas ejector 8 and a monolith catalytic reactor 10.

Tank 4, which commonly existed before the retrofit as a stirred tank slurry reactor, has a jacket 12 for effecting heating and cooling of the contents therein and an agitator 14. Other means, e.g., external exchangers for heating and cooling and agitation of tank contents, such as are commonly encountered in industrial practice may be used in the retrofit apparatus 2. Tank 4 is equipped with at least one liquid feed inlet, typically two or more. As shown, inlet 16 provides for introduction of liquid feed or reactant, which may consist of a liquid compound or a solution of such a compound in a suitable solvent. Inlet line 18 provides for the introduction of reaction effluent from the outlet from monolith catalytic reactor 10. A liquid effluent which consists of reaction product, and may, depending upon conditions, contain unreacted feed, flows via outlet 20 from tank 4 to the inlet of the circulation pump 6.

The circulation pump 6 transfers the liquid reactant to the liquid motive gas ejector 8 via circulation line 22 and liquid flow rate is controlled either through control valve 23 or circulation pump 6. Circulation pump 6 provides the motive energy for drawing reactant gas from the headspace of tank 4 via line 24 or from makeup gas line 26 to the gas inlet of the liquid motive gas ejector. The maximum gas flow is determined by the flow rate of liquid. It may be controlled to a smaller flow by means of valve 27.

The monolith catalytic reactor 10 itself comprises a structure having parallel channels extending along the length of the structure. The structure, commonly referred to as a monolith, may be constructed from ceramic, carbon or metal substrates, or combinations thereof. The structure may be coated with a catalytic material directly or through the use of a washcoating or carbon-coating procedure, using methods known in the art of catalyst preparation. Alternatively, catalyst particles may be placed in the channels rather than coating catalyst materials onto the surface of the channels. The monolith catalytic reactor channels may be of various shapes, e.g., circular, square, rectangular, or hexagonal. The structure may contain from 10 to 1000 cells per square inch of cross-sectional area. A monolith support filled with catalyst may have from 10 to 50 cells per square inch while monolith supports having catalyst coated on the surface may have from 200 to 1000 cells per square inch.

A wide variety of catalytically active materials may be incorporated into or onto the monolith catalytic reactor, depending upon the reaction to be carried out. Examples include precious and transition metals, Raney metals, metal oxides and sulfides, metal complexes and enzymes, and combinations or mixtures thereof, such as a palladium-nickel combination. The concentration of catalytically active compound is determined by the rates of reaction and mass transfer on and to the catalytic surface, and typically ranges from 0.5 to 10% by weight, specified either relative to the weight of the monolith or to the weight of the washcoat, if one is employed.

The reactor diameter and length are sized to provide the desired velocities and residence times in the reactor. The reactor diameter is chosen to achieve a liquid superficial velocity through the reactor of 0.05 to 1.0 meters per second, preferably 0.1 to 0.5 meters per second. These flow rates are consistent with the necessity of obtaining high rates of mass transfer. The reactor length is chosen to achieve a residence time in the reactor of 0.5 to 60 seconds, depending on the rate at which the chemical reaction proceeds. Practical considerations limit the length of the reactor to be no less than half of the diameter of the reactor, and generally no more than about 3 meters.

It has been found that that the performance of the monolith catalytic reactor component of the retrofit apparatus is enhanced by including a liquid motive gas ejector at its inlet. The liquid motive gas ejector combines the liquid with reactant gas under conditions to enhance both mixing and enhanced mass transfer in the monolith catalytic reactor. These improvements can be attained because the liquid motive gas ejector allows one to control the pressure at which the gas-liquid mixture is presented to the monolith catalytic reactor. It is desired that the inlet pressure established by the liquid motive gas ejector exceeds the liquid head in the monolith catalytic reactor. The pressure differential is expressed as pounds per square inch differential (psid). Typically a pressure differential can range from 0 to about 30 psid but preferably ranges from 0.5 to about 20 psid.

One of the advantages achieved through the retrofit apparatus is the fact that the reactants and reaction product, except for the period in which these components are in contact with the catalyst itself during the reaction phase, are kept separate from the catalyst. This is accomplished through the unique configuration of the retrofit apparatus utilizing tank 4, and allows for enhanced catalyst activity, reduced catalyst deactivation rate and fewer byproducts. The mode of operation to attain this enhanced performance is described in the following paragraphs.

Liquid is charged to tank 4 via feed line 16. In some situations it may be advantageous to feed the liquid into the circulation line 22 upstream or downstream of the liquid motive gas ejector or the monolith catalytic reactor. The feed generated in the tank is circulated via the circulation pump to the liquid motive gas ejector and mixed with gas. The process may be operated as a batch whereby the contents in tank 4 are conveyed from the tank, through the ejector, through the monolith catalytic reactor and then back to the tank reactor until the desired conversion is reached. Optionally, the process may be operated continuously by withdrawing a portion of the liquid through product line 28. When the process is not operated continuously, it is usually advantageous to start liquid circulation only after all conditions required for reaction have been attained, e.g., liquid has been heated to temperature and reactant gas is raised to pressure.

Liquid is circulated via the circulation pump 6 from tank 4 and conveyed via line 22 to the inlet of the liquid motive gas ejector 8. The gaseous component for the reaction is withdrawn from the headspace of tank 4 through suction line 24, and is simultaneously compressed by and mixed with the high pressure liquid introduced to the liquid motive gas ejector. Generally, the volumetric flow of reactant gas is from about 5 to 200%, typically from 50 to 150% of the volume of reactant liquid. As reactant gas is consumed in the catalytic reactor, it may be supplemented with makeup gas entering through line 26. Makeup gas may be introduced at any point in the process, such as into the headspace or liquid contents of tank 4, into suction line 24, or into piping downstream of the ejector.

The introduction of the liquid motive gas ejector presents a considerable advantage over operation in gravity downflow mode. In gravity downflow mode, the liquid superficial velocity is determined to a great extent by the size of the flow passages (monolith channels, or spacing between particles inside these channels). Gravity downflow operation is limited in most practical cases to monoliths having no more than 400 unobstructed channels per square inch of cross-section. Also, gravity mode is subject to flow instabilities and reversal of flow direction. The ability to generate high pressure drops through the monolith catalytic reactor and high liquid velocities allows one to attain high rates of mass transfer. It also allows operation of the monolith at any angle to the vertical, including an upflow mode or in a horizontal position; it also avoids instabilities in the process.

Because the reactor component of the retrofit apparatus is separate from the feed and reaction product maintained within tank 4, the reaction can be conducted until a desired conversion is reached, at which time circulation through the reactor is terminated. Final reaction product is removed via line 28. This allows one to optimize conversion with selectivity, since often higher conversions lead to greater by-product formation. Furthermore, at a given conversion, by-product formation is normally lower than in conventional stirred tank operations because the liquid is not in constant contact with the catalyst component of the reaction system, and because high rates of mass transfer can routinely be attained by the combination of the ejector and the monolith catalytic reactor.

The following examples illustrate various embodiments of the invention and in comparison with the prior art.

EXAMPLE 1

Gravity Downflow Through Monolith Structure

In this example an apparatus incorporating the elements of the invention (tank, pump, liquid motive gas ejector, and a monolithic structure having a diameter of 2 inches and a length of 24 inches, and incorporating 400 channels per square inch of cross-sectional area) was used to measure the rate of mass transfer of oxygen from the gas phase (air) to the liquid phase (an aqueous solution of sodium sulfite), using the steady-state sulfite oxidation method. The liquid motive gas ejector was used as the gas-liquid distribution device, but operated in such a way as to simulate gravity downflow conditions.

The liquid flowrate through the ejector and the monolith structure were chosen so that there was no net pressure drop through the monolith structure, i.e., the frictional pressure loss equaled the static pressure increase. This condition was attained by limiting the liquid flow, and was established at the following operating parameters: liquid flowrate, 9.1 liters per minute; gas flowrate, 10.0 liters per minute; liquid pressure at inlet to the ejector: 11 psig; net pressure drop: 0 psid.

The rate of mass transfer is described by means of the volumetric gas-liquid mass transfer coefficient, $k_L$ a. The greater the value of $k_L$ a, the greater the potential productivity of the reactor in a reactive gas-liquid environment. The coefficient $k_L$ a was measured at this condition, and found to be 1.45 seconds$^{-1}$.

EXAMPLE 2

Ejector-Driven Flow Through Monolith Structure

Using the apparatus described in Example 1, flow conditions were established using the ejector as both a liquid-gas distribution device and as a gas compressor, i.e., without restricting the liquid flow. At this condition, the corresponding operating parameters were: liquid flowrate, 23.9 liters per minute; gas flowrate, 36.1 liters per minute; liquid pressure at inlet to the ejector: 65 psig; net pressure drop:~3.3 psid The coefficient $k_L$ a was measured at this condition and found to be 5.48 seconds.$^{-1}$ Table 1 below compares the results of Examples 1 and 2.

|  | Superficial liquid velocity | Superficial gas velocity | Net pressure drop | Coefficient seconds$^{-1}$ kLa |
| --- | --- | --- | --- | --- |
| Example 1 | 0.092 m/s | 0.101 m/s | 0 psid | 1.45 |
| Example 2 | 0.242 m/s | 0.367 m/s | 3.3 psid | 5.48 |

Clearly, from Table 1 the gravity downflow mode of operation limits the liquid and gas superficial velocities that can be attained, and thereby limits the gas-liquid mass transfer coefficient. In ejector-driven flow mode, a net positive pressure drop can be used to increase liquid and gas superficial velocities, which yields a great benefit in the gas-liquid mass transfer coefficient. That large improvement in mass transfer is due to the net pressure driving force exerted by the liquid-motive gas ejector. The ability to achieve a positive pressure driving force allows the use of more restricted monolith catalytic reactors and monolith catalytic reactors having greater numbers of channels per square inch simultaneously with high levels of mass transfer, which then can enhance productivity.

What is claimed is:

1. In a process for the catalytic reaction of a liquid reactant and a gaseous reactant to form a product, the improvement which comprises:

(a) pressurizing said liquid reactant and, then, introducing the resultant pressurized liquid reactant to a liquid motive gas ejector;

(b) contacting said gaseous reactant with the resultant pressurized liquid reactant in said liquid motive gas ejector under conditions for forming a pressurized mixture of said liquid reactant and said gaseous reactant;

(c) removing the pressurized mixture of liquid reactant and gaseous reactant from said liquid motive gas ejector and passing said pressurized mixture through a monolith catalytic reactor;

(d) effecting reaction between said liquid reactant and said gaseous reactant while said mixture is in said monolith catalytic reactor thereby forming a reaction product containing unreacted liquid reactant, unreacted gaseous reactant and product;

(e) removing said reaction product from the monolith catalytic reactor at a reduced pressure and, then introducing said reaction product to a tank adapted for retaining the reaction product containing unreacted liquid reactant as liquid and retaining unreacted reactant gas within a headspace in said tank;

(f) removing at least a portion of said reaction product containing unreacted liquid reactant from said tank and circulating said portion of said reaction product containing unreacted liquid reactant by pumping to the liquid motive gas ejector;

(g) removing unreacted gaseous reactant from the headspace of said tank and circulating said unreacted gaseous reactant to the liquid motive ejector; and, (h) removing product from the process.

2. The process of claim 1 wherein the residence time of the mixture within the monolith catalytic reactor is from 0.5 to 60 seconds.

3. The process of claim 1 wherein the monolith catalytic reactor has from 10 to 50 channels per square inch and the channels are filled with catalyst particles.

4. The process of claim 1 wherein the pressure differential through the monolith catalytic reactor is from 0.5 to 30 pounds per square inch.

5. The process of claim 1 wherein the channel density in the monolith catalytic reactor is from 200 to 1000 channels per square inch and the catalyst is coated on the support walls.

* * * * *